Figure 1:
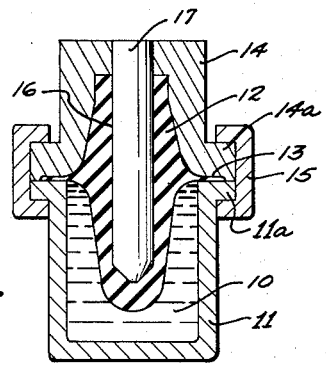

April 13, 1965 S. VERNET 3,177,721

RUBBER COMPOUND AND BARRIER MEMBER MADE THEREFROM

Filed Sept. 19, 1960

INVENTOR.
SERGIUS VERNET,
BY
ATTORNEYS.

3,177,721
RUBBER COMPOUND AND BARRIER MEMBER MADE THEREFROM

Sergius Vernet, Yellow Springs, Ohio, assignor to Vernay Laboratories, Inc., Yellow Springs, Ohio, a corporation of Ohio
Filed Sept. 19, 1960, Ser. No. 57,007
12 Claims. (Cl. 73—368.3)

This invention relates to a rubber compound and to a barrier member made therefrom, which barrier member may be used in seals of all kinds. The invention has particular application to temperature sensitive power elements such as are disclosed and claimed in my application for U.S. Letters Patent Ser. No. 624,871, filed November 28, 1956, now Patent No. 3,016,747, issued January 16, 1962.

In these temperature sensitive power elements, a body of material which is sensitive to temperature changes is confined in a metallic cup by means of a rubber barrier element. The rubber barrier element has a bore within which a piston is seated. When the cup member containing the heat sensitive material is subjected to an increase in temperature, the material therein expands and through the barrier member transmits a thrust to the piston which is then used to actuate a desired mechanism.

In such devices it is desirable to provide for the lubrication of the piston with respect to the rubber barrier member in which it is disposed but often these temperature sensitive power elements are located in a position such that external lubrication is very difficult. A material which may be used as the temperature sensitive material in such power elements is a petroleum base wax which has lubricating qualities. Accordingly, the material which is confined in the element may be used as a lubricant if it is possible for the lubricant to have access to the piston in minute quantities at a controlled rate.

It is therefor an object of the present invention to provide a rubber barrier member so compounded that the lubricant, which in this particular instance is a petroleum base wax, may pass through the rubber at a controlled rate to lubricate the piston element.

More broadly, there are many instances where a movable element such as a rotating or reciprocating shaft must pass through a seal in a housing wherein a portion of the shaft is within the housing which contains a particular medium and another portion of the shaft is outside the housing in the atmosphere. It is, therefore, a further and more broad object of the invention to provide a lubricating seal by a particular rubber compound as outlined above.

Generally, it is an object of the invention to compound an article of manufacture of rubber such that a lubricant may pass through the rubber at a controlled rate, which rate may be adjusted in the compounding of the rubber depending upon the particular type of lubricant in question.

These and other objects of the invention which will be pointed out in more detail hereinafter or which will be apparent to one skilled in the art upon reading these specifications, I accomplish by that compound and by that construction of which I shall now disclose certain exemplary embodiments.

Figure 2:
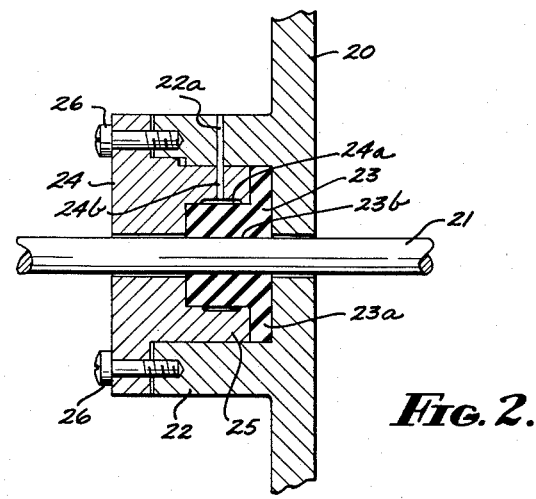

Reference is made to the drawing forming a part hereof and in which:

FIGURE 1 is a cross-sectional view through a typical temperature sensitive power element embodying the present invention; and FIGURE 2 is a cross-sectional view through a typical seal embodying the present invention.

Briefly, in the practice of my invention I utilize the fact that there are some rubbers which are permeable to various lubricants. Broadly speaking, such lubricants may be hydrocarbons and their derivatives which have lubricating characteristics as, for example, petroleum base wax, petroleum base oils, normal chain type aliphatic hydrocarbons, whether or not they are saturated, and branch type aliphatic hydrocarbons, whether or not they are saturated. All of these are intended to be included in the term "lubricant" as used herein.

As examples of rubbers which are permeable to these lubricants are compounds of natural rubber, styrene butadiene copolymer (sometimes called SBR), polybutadiene and polyisoprene isomers.

There are other rubbers which are substantially impermeable to the lubricants in question. Examples of these are acrylonitrile butadiene copolymer (sometimes called NBR and also sometimes called buna N), rubbers of the fluorocarbon type, polyacrylate rubbers and chloroprene rubbers.

Throughout the specification and claims I have used the term "lubricant permeable rubber" to cover the permeable rubbers as first defined above; and I have used the phase "rubber which is substantially impermeable" to cover the impermeable rubbers as next defined above.

I have found that the rate of passage of a lubricant through a rubber barrier member can be controlled by compounding the rubber of the barrier member from a major proportion of a substantial lubricant impermeable rubber and a minor proportion of a lubricant permeable rubber. Having in mind the particular lubricant in question, one skilled in the art may determine the particular proportions and selection of the permeable and impermeable rubbers to be used to achieve the desired rate of passage of the particular oil for the particular use in question.

For example, in a temperature sensitive power element such as is shown in FIGURE 1, a body of refined petroleum base wax 10 is contained in a metallic cup member 11. A rubber barrier member 12 having a flange 13 is held in position by a sleeve member 14 and the flanges 14a of the sleeve member and 11a of the cup member and 13 of the barrier member 12 are clamped together by means of a crimp ring 15. The barrier member 12 has a bore 16 in which there is disposed a piston element 17. As the material 10 is subjected to an increase in temperature and expands, it forces the piston 17 outward. Generally a spring (not shown) is provided to push the piston 17 inwardly when the material 10 contracts upon cooling. It is desirable to provide lubrication for the piston 17 with respect to the bore 16 and according to my invention this can be accomplished by properly compounding the material of the barrier member 12 so that some of the petroleum base wax 10 can pass through the member 12 to provide this lubrication.

As a specific example, where a temperature sensitive power element as shown in FIGURE 1 is intended to operate with a petroleum base wax having a melting point between 150° F. and 210° F., a very successful rubber compound is one in which the total polymer content consists essentially of 80% by volume of acrylonitrile butadiene copolymer containing from 30% to 35% acrylonitrile and 20% styrene butadiene copolymer. As to the styrene butadiene copolymers, the styrene level thereof is not critical.

While the proportion of 80% NBR to 20% SBR is preferred, I find that good results may be obtained with the NBR constituting from about 95% to about 60% by volume of the polymer content of the compound and with the SBR constituting from about 5% to about 40% by volume of the polymer content of the compound.

As a general guide the proportions must be changed for a given rate of passage of lubricant as the melting point of the wax is changed. Thus, if a refined petroleum base wax with a higher melting point is used, the wax molecules will be larger in size and it will be necessary to increase the SBR content and reduce the NBR content. Conversely, if a refined petroleum base wax having a lower melting point is used, the wax molecules will be smaller and it will be necessary to decrease the SBR content and increase the NBR content.

It will be understood that these quantities are given only as a guide and that the particular figures are exemplary for a petroleum base wax. It will be understood by those skilled in the art that with other lubricants, the molecule size for a given melting point may be different and the proportions will have to be changed accordingly.

In FIGURE 2, I have shown how the invention may be adapted to a seal. The showing is to be understood as being diagrammatic in nature. The reference numeral 20 indicates the wall of a housing separating a particular medium from the atmosphere. A member 21 must extend through this wall and be free, for example, either to rotate or reciprocate axially and yet a seal must be provided against the atmosphere. In FIGURE 2 it will be understood that the shaft 21 is provided with bearings, not shown. By way of example, the wall 20 may be provided with a cup-like member 22 within which may be seated a barrier member 23 compounded from rubber, as above disclosed. A cap member 24 is provided with a collar portion 25 so that when the screws 26 are drawn up tightly the collar portion 25 will bear against the flange 23a of the member 23 and press it into sealing engagement with the housing wall 20. The shaft 21 is in sealing engagement with a bore 23b in the member 23.

The member 24 may be provided with an internal annular oil groove 24a communicating with an oil hole 24b and the cup member 22 may be provided with an oil hole 22a. In this example, oil may be supplied to the oil hole 22a since it passes through the hole 24b aligned therewith and into the annular groove 24a where it comes into contact with the rubber barrier member 23. By proper compounding of the member 23, the oil may pass therethrough at a controlled rate to lubricate the shaft 21. The rate of course will be determined by the rate of rotation or reciprocation of the shaft 21.

The present invention has the advantage of reducing friction between metal and rubber parts whereby to decrease the wear on the rubber parts and greatly lengthen their life.

It will be understood that numerous modifications may be made without departing from the spirit of the invention. I therefore do not intend to limit myself otherwise than as set forth in the claims which follow.

Having now fully described the invention, what I claim as new and desire to secure by Letters Patent is:

1. A seal comprising a barrier member comprised of a material consisting essentially of a major proportion of a rubber which is substantially lubricant impermeable and a minor proportion of a lubricant permeable rubber, said proportions being such, with regard to the lubricant, as to permit passage of said lubricant through said barrier member at a controlled rate; the lubricant comprising hydrocarbons and their derivatives which have lubricating characteristics including petroleum base wax and petroleum base oils and saturated and normal chain type aliphatic hydrocarbons and branch type aliphatic hydrocarbons; the lubricant permeable rubber comprising compounds of natural rubber, styrene-butadiene copolymer (SBR), polybutadiene and polyisoprene isomers; and the rubber which is substantially lubricant impermeable comprising acrylonitrile-butadiene copolymer (NBR and buna N), rubbers of the fluorocarbon type, polyacrylate rubbers and chloroprene rubbers.

2. In a seal separating one particular medium from another, wherein a metallic member moves in sealing engagement with a member constituting the barrier, comprising means providing access for lubricant to said barrier member, said barrier member being of a material the total polymer content of which consists essentially of a major proportion by volume of acrylonitrile butadiene copolymer containing from 30% to 35% co-polymerized acrylonitrile and a minor proportion by volume of styrene butadiene copolymer, said proportions being such, with regard to the lubricant, as to permit passage of said lubricant through said barrier member at a controlled rate.

3. In a seal separating one particular medium from another, wherein a metallic member moves in sealing engagement with a member constituting the barrier, comprising means providing access for a petroleum base wax lubricant to said barrier member, said barrier member being composed of a material the total polymer content of which consists essentially of from about 95% by volume to about 60% by volume of a rubber which is substantially lubricant impermeable, and from about 5% by volume to about 40% by volume of a lubricant permeable rubber, whereby to permit passage of said petroleum base wax lubricant through said barrier member at a controlled rate; the lubricant permeable rubber comprising compounds of natural rubber, styrene-butadiene copolymer (SBR), polybutadiene and polyisoprene isomers; and the rubber which is substantially lubricant impermeable comprising acrylonitrile-butadiene copolymer (NBR and buna N), rubbers of the fluorocarbon type, polyacrylate rubbers and chloroprene rubbers.

4. In a seal separating one particular medium from another, wherein a metallic member moves in sealing engagement with a member constituting the barrier, comprising means providing access for a petroleum base wax lubricant to said barrier member, said barrier member being composed of a material the total polymer content of which consists essentially of from about 95% by volume to about 60% by volume of acrylonitrile butadiene copolymer containing from 30% to 35% co-polymerized acrylonitrile and from about 5% by volume to about 40% by volume of styrene butadiene copolymer, whereby to permit passage of said petroleum base wax lubricant through said barrier member at a controlled rate.

5. In a seal separating one particular medium from another, wherein a metallic member moves in sealing engagement with a member constituting the barrier, comprising means providing access for a petroleum base wax lubricant to said barrier member, said barrier member being composed of a material the total polymer content of which consists essentially of about 80% by volume of a rubber which is substantially lubricant impermeable, and about 20% by volume of a lubricant permeable rubber, whereby to permit passage of said petroleum base wax lubricant through said barrier member at a controlled rate; the lubricant permeable rubber comprising compounds of natural rubber, styrene-butadiene copolymer (SBR), polybutadiene and polyisoprene isomers; and the rubber which is substantially lubricant impermeable comprising acrylonitrile-butadiene copolymer (NBR and buna N), rubbers of the fluorocarbon type, polyacrylate rubbers and chloroprene rubbers.

6. In a seal separating one particular medium from another, wherein a metallic member moves in sealing engagement with a member constituting the barrier, comprising means providing access for a petroleum base wax lubricant to said barrier member, said barrier member being composed of a material the total polymer content of which consists essentially of about 80% by volume of acrylonitrile butadiene copolymer containing from 30% to 35% co-polymerized acrylonitrile and about 20% by volume of styrene butadiene copolymer, whereby to permit passage of said petroleum base wax lubricant through said barrier member at a controlled rate.

7. In a temperature sensitive power element wherein a body of material which is sensitive to temperature changes is confined in a metallic cup member by a flexible barrier member, said barrier member having a bore within which a metallic piston element is disposed, the improvement which comprises: means to lubricate said piston element; said means including (a) said body of material and (b) said barrier member; said barrier member being of a material the total polymer content of which consists essentially of a major proportion of a rubber which is substantially impermeable to said body of material, and a minor proportion of a rubber which is permeable to said body of material, whereby said body of material may pass through said barrier member at a controlled rate to lubricate said piston element; the rubber which is permeable to said body of material comprising compounds of natural rubber, styrene-butadiene copolymer (SBR), polybutadiene and polyisoprene isomers; and the rubber which is impermeable to said body of material comprising acrylonitrile-butadiene copolymer (NBR and buna N), rubbers of the fluorocarbon type, polyacrylate rubbers and chloroprene rubbers.

8. In a temperature sensitive power element wherein a body of petroleum base wax is confined in a metallic cup member by a flexible barrier member, said barrier member having a bore within which a metallic piston element is disposed, the improvement which comprises: means to lubricate said piston element; said means including (a) said body of petroleum base wax and (b) said barrier member; said barrier member being of a material the total polymer content of which consists essentially of a major proportion by volume of acrylonitrile butadiene copolymer containing from 30% to 35% co-polymerized acrylonitrile and a minor proportion by volume of styrene butadiene copolymer, whereby said petroleum base wax may pass through said barrier member at a controlled rate to lubricate said piston element.

9. In a temperature sensitive power element wherein a body of petroleum base wax is confined in a metallic cup member by a flexible barrier member, said barrier member having a bore within which a metallic piston element is disposed, the improvement which comprises: means to lubricate said piston element; said means including (a) said body of petroleum base wax and (b) said barrier member; said barrier member being of a material the total polymer content of which consists essentially of from about 95% by volume to about 60% by volume of a rubber which is substantially impermeable to said body of petroleum base wax, and from about 5% by volume to about 40% by volume of a rubber which is permeable to said body of petroleum base wax, whereby said petroleum base wax may pass through said barrier member at a controlled rate to lubricate said piston element; the rubber which is permeable to said petroleum base wax comprising compounds of natural rubber, styrene-butadiene copolymer (SBR), polybutadiene and polyisoprene isomers; and the rubber which is impermeable to said body of petroleum base wax comprising acrylonitrile-butadiene copolymer (NBR and buna N), rubbers of the fluorocarbon type, polyacrylate rubbers and chloroprene rubbers.

10. In a temperature sensitive power element wherein a body of petroleum base wax is confined in a metallic cup member by a flexible barrier member, said barrier member having a bore within which a metallic piston element is disposed, the improvement which comprises: means to lubricate said piston element; said means including (a) said body of petroleum base wax and (b) said barrier member; said barrier member being of a material the total polymer content of which consists essentially of from about 95% by volume to about 60% by volume of acrylonitrile butadiene copolymer containing from 30% to 35% copolymerized acrylonitrile, and from about 5% by volume to about 40% by volume of styrene butadiene copolymer, whereby said petroleum base wax may pass through said barrier member at a controlled rate to lubricate said piston element.

11. In a temperature sensitive power element wherein a body of petroleum base wax is confined in a metallic cup member by a flexible barrier member, said barrier member having a bore within which a metallic piston element is disposed, the improvement which comprises: means to lubricate said piston element; said means including (a) said body of petroleum base wax and (b) said barrier member; said barrier member being composed of a material the total polymer content of which consists essentially of about 80% by volume of a rubber which is substantially impermeable to said body of petroleum base wax, and about 20% by volume of a rubber which is permeable to said body of petroleum base wax, whereby said petroleum base wax may pass through said barrier member at a controlled rate to lubricate said piston element; the rubber which is permeable to said body of petroleum base wax comprising compounds of natural rubber, styrene-butadiene copolymer (SBR), polybutadiene and polyisoprene isomers; and the rubber which is impermeable to said body of petroleum base wax comprising acrylonitrile-butadiene copolymer (NBR and buna N), rubbers of the fluorocarbon type, polyacrylate rubbers and chloroprene rubbers.

12. In a temperature sensitive power element wherein a body of petroleum base wax is confined in a metallic cup member by a flexible barrier member, said barrier member having a bore within which a metallic piston element is disposed, the improvement which comprises: means to lubricate said piston element; said means including (a) said body of petroleum base wax and (b) said barrier member; said barrier member being composed of a material the total polymer content of which consists essentially of about 80% by volume of acrylonitrile butadiene copolymer containing from 30% to 35% copolymerized acrylonitrile and about 20% by volume of styrene butadiene copolymer, whereby said petroleum base wax may pass through said barrier member at a controlled rate to lubricate said piston element.

References Cited in the file of this patent
UNITED STATES PATENTS

| | | |
|---|---|---|
| 2,381,248 | Bascom | Aug. 7, 1945 |
| 2,473,139 | Dickerman | June 14, 1949 |
| 2,593,681 | Leydon | Apr. 22, 1952 |
| 2,614,093 | Wheelock | Oct. 14, 1952 |
| 2,657,190 | Banes et al. | Oct. 27, 1953 |
| 2,873,609 | Von Wangenheim | Feb. 17, 1959 |
| 2,924,975 | Vernet | Feb. 16, 1960 |